United States Patent
Velarde et al.

(10) Patent No.: US 8,130,313 B2
(45) Date of Patent: Mar. 6, 2012

(54) SYSTEM AND METHOD TO ESTIMATE AUTOEXPOSURE CONTROL AND AUTO WHITE BALANCE

(75) Inventors: Ruben M. Velarde, Chula Vista, CA (US); Kalin M. Atanassov, San Diego, CA (US); Szepo R. Hung, Carlsbad, CA (US)

(73) Assignee: QUALCOMM Incorporated, San Diego, CA (US)

( * ) Notice: Subject to any disclaimer, the term of this patent is extended or adjusted under 35 U.S.C. 154(b) by 537 days.

(21) Appl. No.: 12/340,046

(22) Filed: Dec. 19, 2008

(65) Prior Publication Data
US 2010/0157139 A1 Jun. 24, 2010

(51) Int. Cl.
*H04N 5/222* (2006.01)

(52) U.S. Cl. ............ 348/371; 348/222.1; 348/362

(58) Field of Classification Search ......... 348/208.11, 348/371, 222.1, 362
See application file for complete search history.

(56) References Cited

U.S. PATENT DOCUMENTS

| | | | |
|---|---|---|---|
| 6,885,405 B1 | 4/2005 | Steinberg et al. | |
| 2007/0248342 A1 | 10/2007 | Tamminen et al. | |
| 2008/0106636 A1 | 5/2008 | Wernersson | |
| 2008/0252749 A1 | 10/2008 | Fujiwara | |
| 2009/0160944 A1* | 6/2009 | Trevelyan et al. | 348/187 |

OTHER PUBLICATIONS

International Search Report and Written Opinion—PCT/US2009/066484-ISAEPO-Mar. 10, 2010.

* cited by examiner

*Primary Examiner* — Gevell Selby
(74) *Attorney, Agent, or Firm* — James R. Gambale, Jr.; Matthew J. Evans

(57) ABSTRACT

In a particular embodiment, a method is disclosed that includes determining at least one ambient exposure parameter using an ambient illumination, the at least one ambient exposure parameter including a first sensitivity parameter of an autoexposure controller using the ambient illumination. The method includes determining at least one low-illumination parameter using a first lamp level, the at least one low-illumination parameter including a second sensitivity parameter of the autoexposure controller using the first lamp level, where the autoexposure controller is configured to operate according to at least one high-illumination parameter based on the at least one ambient exposure parameter and the at least one low-illumination parameter. The method further includes performing an image capture operation using a second lamp level that is brighter than the first lamp level, where the at least one high-illumination parameter includes a third sensitivity parameter.

31 Claims, 10 Drawing Sheets

SYSTEM AND METHOD TO ESTIMATE AUTOEXPOSURE CONTROL AND AUTO WHITE BALANCE

FIELD OF THE DISCLOSURE

The present disclosure is generally directed to a system and method to estimate autoexposure control and auto white balance.

BACKGROUND

Advances in technology have resulted in smaller and more powerful computing devices. For example, there currently exist a variety of portable personal computing devices, including wireless computing devices, such as portable wireless telephones, personal digital assistants (PDAs), and paging devices that are small, lightweight, and easily carried by users. More specifically, portable wireless telephones, such as cellular telephones and Internet Protocol (IP) telephones, can communicate voice and data packets over wireless networks. Further, many such wireless telephones include other types of devices that are incorporated therein. For example, wireless telephones can also include a digital still camera, a digital video camera, a digital recorder, and an audio file player. Also, such wireless telephones can process executable instructions, including software applications, such as a web browser application, that can be used to access the Internet. As such, these wireless telephones can include significant computing capabilities.

Digital signal processors (DSPs), image processors, and other processing devices are frequently used in portable personal computing devices that include digital cameras, or that display image or video data captured by a digital camera. Such processing devices can be utilized to provide video and audio functions, to process received data such as image data, or to perform other functions.

Cell phone cameras are increasingly incorporating light-emitting diode (LED) type flash systems. However, LED-type flash devices are generally not driven continuously in a high power flash mode due to concerns about power consumption and damage to the LED-type flash device components. However, not knowing the effect of the high-power LED flash on the image may lead to overexposure of a snapshot or video frame and application of the wrong white balance.

SUMMARY

In a particular embodiment, a method is disclosed that includes determining at least one ambient exposure parameter using an ambient illumination, the at least one ambient exposure parameter including a first sensitivity parameter of an autoexposure controller using the ambient illumination. The method includes determining at least one low-illumination parameter using a first lamp level, the at least one low-illumination parameter including a second sensitivity parameter of the autoexposure controller using the first lamp level, where the autoexposure controller is configured to operate according to at least one high-illumination parameter based on the at least one ambient exposure parameter and the at least one low-illumination parameter. The method further includes performing an image capture operation using a second lamp level that is brighter than the first lamp level, where the at least one high-illumination parameter includes a third sensitivity parameter calculated at least partially based on a ratio of an illuminance corresponding to the second lamp level to an illuminance corresponding to the first lamp level, the third sensitivity parameter determined further based on a difference of a first image frame brightness at an image sensor during the first lamp level illumination and a second image frame brightness at the image sensor during the ambient illumination.

In another embodiment, a method is disclosed that includes determining at least one ambient exposure parameter using an ambient illumination, the at least one ambient exposure parameter including a first sensitivity parameter of an autoexposure controller using the ambient illumination. The method also includes determining at least one low-illumination parameter using a low-power illumination mode of a flash device, the at least one low-illumination parameter including a second sensitivity parameter of the autoexposure controller using the low-power illumination mode. The method further includes performing an image capture operation using a high-power illumination mode of the flash device, where the autoexposure controller is configured to operate according to at least one high-illumination parameter based on the at least one ambient exposure parameter and the at least one low-illumination parameter, and where the at least one high-illumination parameter includes a third sensitivity parameter calculated at least partially based on a ratio of an illuminance corresponding to the high-power illumination mode to an illuminance corresponding to the low-power illumination mode, the third sensitivity parameter determined further based on a difference of an image frame brightness at an image sensor during the low-power illumination mode and an image frame brightness at the image sensor during the ambient illumination.

In another embodiment, an apparatus is disclosed that includes an autoexposure controller configured to operate according to at least one high-illumination parameter based on at least one ambient exposure parameter and at least one low-illumination parameter. The at least one ambient exposure parameter is determined using an ambient illumination and includes a first sensitivity parameter of the autoexposure controller using the ambient illumination. The at least one low-illumination parameter is determined using a low-power illumination mode of a flash device and includes a second sensitivity parameter of the autoexposure controller using the low-power illumination mode. A high-power illumination mode of the flash device is used to perform an image capture operation, where the at least one high-illumination parameter includes a third sensitivity parameter calculated at least partially based on a ratio of an illuminance corresponding to the high-power illumination mode to an illuminance corresponding to the low-power illumination mode. The third sensitivity parameter is determined further based on a difference of an image frame brightness at an image sensor during the low-power illumination mode and an image frame brightness at the image sensor during the ambient illumination.

In another embodiment, an apparatus is disclosed that includes means for controlling an autoexposure to operate according to at least one high-illumination parameter based on at least one ambient exposure parameter and at least one low-illumination parameter. The apparatus also includes means for controlling an auto white balance. The at least one ambient exposure parameter is determined using an ambient illumination, the at least one ambient exposure parameter including a first sensitivity parameter of the means for controlling the autoexposure using the ambient illumination. The at least one low-illumination parameter is determined using a low-power illumination mode of a flash device, the at least one low-illumination parameter including a second sensitivity parameter of the means for controlling the autoexposure using the low-power illumination mode. A high-power illumination mode of the flash device is used to perform an image capture operation, where the at least one high-illumination parameter includes a third sensitivity parameter calculated at least partially based on a ratio of an illuminance corresponding to the high-power illumination mode to an illuminance corresponding to the low-power illumination mode. The third sensitivity parameter is determined further based on a difference of an image frame brightness at an image sensor during the low-power illumination mode and an image frame brightness at the image sensor during the ambient illumination. The first, the second, and the third sensitivity parameters are provided to the means for controlling the auto white balance by the means for controlling the autoexposure.

In another embodiment, a computer-readable medium is disclosed. The computer-readable medium includes computer executable instructions that are operative to cause a computer to determine at least one ambient exposure parameter, the at least one ambient exposure parameter including a first sensitivity parameter of an autoexposure controller using an ambient illumination. The computer executable instructions are further operative to cause the computer to determine at least one low-illumination parameter, the at least one low-illumination parameter including a second sensitivity parameter of the autoexposure controller using a first lamp level. The computer executable instructions are also operative to cause the computer to configure the autoexposure controller to operate according to at least one high-illumination parameter based on the at least one ambient exposure parameter and the at least one low-illumination parameter. The computer executable instructions are further operative to cause the computer to perform an image capture operation using a second lamp level that is brighter than the first lamp level, where the at least one high-illumination parameter includes a third sensitivity parameter calculated at least partially based on a ratio of an illuminance corresponding to the second lamp level to an illuminance corresponding to the first lamp level. The third sensitivity parameter is determined further based on a difference of an image frame brightness at an image sensor during the first lamp level illumination and an image frame brightness at the image sensor during the ambient illumination.

One particular advantage provided by disclosed embodiments is that an estimation of autoexposure control and auto white balance during a high-power flash illumination prevents overexposure of a snapshot or a video frame and prevents an inappropriate white balance from being applied on the snapshot or the video frame.

Another advantage provided by disclosed embodiments is that the autoexposure control estimates the overall combination of illuminance from a flash at full power and ambient illumination, and also generates sensitivity values for each flash mode of operation that are provided to the auto white balance for proper white balance gain prediction.

Other aspects, advantages, and features of the present disclosure will become apparent after review of the entire application, including the following sections: Brief Description of the Drawings, Detailed Description, and the Claims.

DETAILED DESCRIPTION

Figure 1:
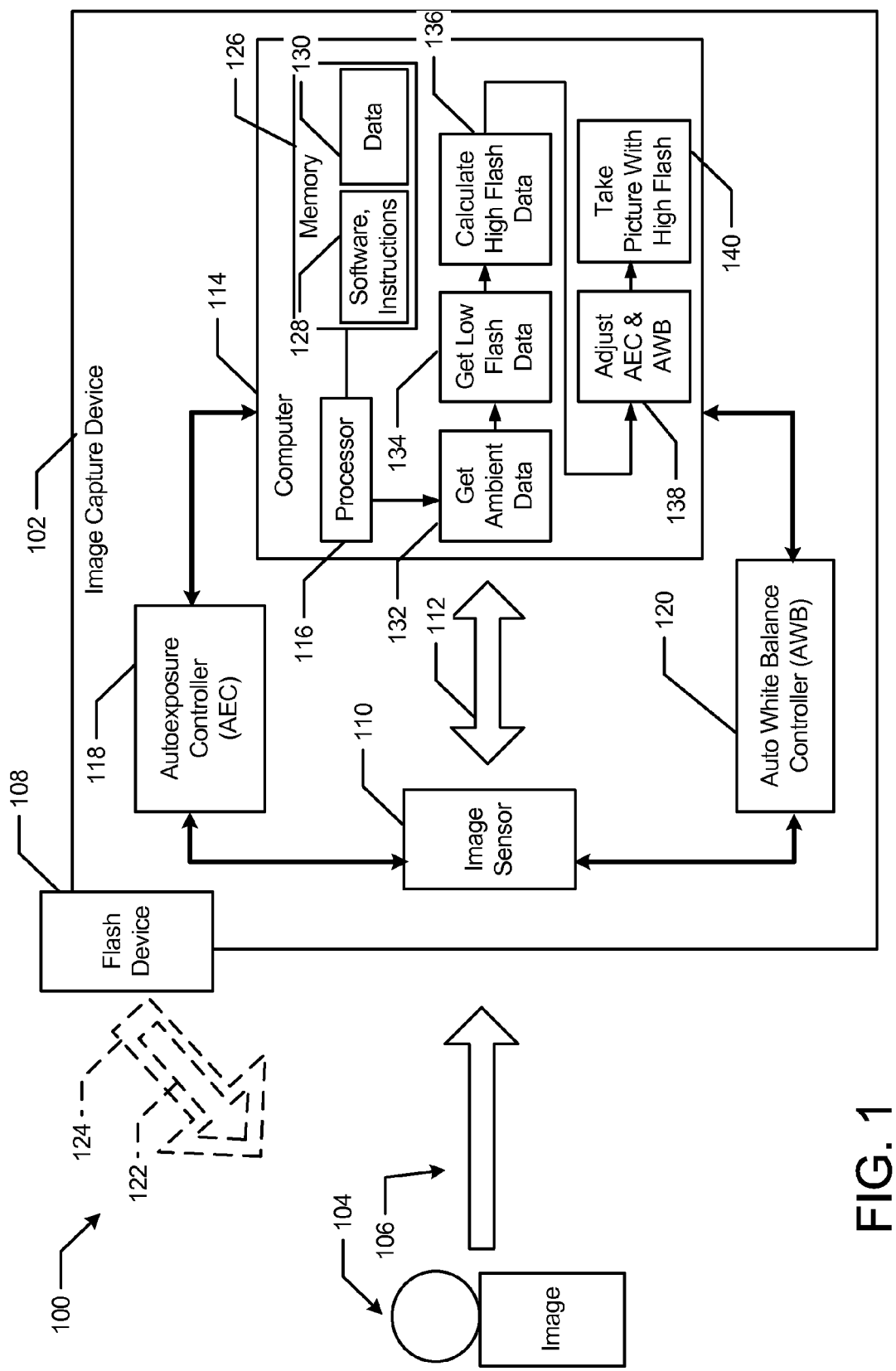
FIG. 1 is a block diagram of a particular illustrative embodiment of a system that includes a flash device coupled to an image capture device having an autoexposure controller and an auto white balance controller.

Referring to FIG. 1, an image capture system 100 is illustrated. The image capture system 100 includes a flash device 108 coupled to an image capture device 102. The image capture device 102 includes an image sensor 110 coupled, as shown at 112, to a computer 114. The image capture device 102 also includes an autoexposure controller (AEC) 118 and an auto white balance controller (AWB) 120. Both the autoexposure controller 118 and the auto white balance controller 120 are respectively coupled to the image sensor 110 and to the computer 114. The computer 114 includes a processor 116, such as a digital signal processor (DSP). The computer 114 also includes a memory 126 that includes software and instructions 128 and data 130. The memory 126 is coupled to the processor 116 and may be a random access memory device or a non-volatile memory device such as a read-only memory or flash memory.

The flash device 108 has a low-power illumination mode, indicated in phantom at 122. The flash device 108 also has a high-power illumination mode, indicated in phantom at 124, which is brighter than the low-power illumination mode. In a particular embodiment, a first lamp level may be generated by a low-power mode of the flash device 108 coupled to a camera and a second lamp level brighter than the first lamp level may be generated by a high-power mode of the flash device 108 coupled to the camera. In a particular embodiment, the flash device 108 may be a light-emitting diode (LED) type flash device, with the low-power illumination mode 122 corresponding to an LED current of about 100 milliamps (mA), and with the high-power illumination mode 124 corresponding to an LED current of about 600 mA. In another particular embodiment, the flash device 108 may be a xenon-type flash device.

The low-power illumination mode 122 may be used during a preview to predict the effect of the high-power illumination mode 124 on an image 104. For example, if the exposure and white balance parameters for the low-power illumination mode 122 were used with the high-power illumination mode 124 for image capture, the image 104 will likely be overexposed and an inappropriate white balance may be applied. Predicting the effect of the high-power illumination mode 124 can prevent overexposure of the image 104 and prevent an inappropriate white balance from being applied on the snapshot image capture. During the preview, prior to the snapshot image capture, the autoexposure controller 118 collects statistics of the scene with and without the flash device 108 being used in the low-power illumination mode 122. Using these reference points and knowing the flux ratio, which is the same as the illuminance ratio, between the flash device 108 at the low-power illumination mode 122 and at the high-power illumination mode 124, an estimate may be made of the influence the high-power illumination mode 124 of the flash device 108 will have on the scene. The autoexposure controller 118 estimates the overall combination of the illuminance from the ambient light and from the flash device 108 at the high-power illumination mode 124. The autoexposure controller 118 also generates sensitivity values for each mode of operation of the flash device 108 and provides the sensitivity values to the auto white balance controller 120 for proper white balance gain prediction.

In operation, the image 104 may be presented, as indicated at 106, to the image sensor 110. The processor 116 may direct the autoexposure controller 118 to get ambient data, at 132. The flash device 108 may be turned on to the low-power illumination mode 122. The processor 116 may direct the autoexposure controller 118 to get low flash data, at 134. The processor 116 may calculate high flash data, at 136, and adjust the autoexposure controller (AEC) 118 and the auto white balance controller (AWB) 120 accordingly, at 138. The processor 116 may take a picture with high flash, at 140, with the flash device 108 operating at the high-power illumination mode 124.

Figure 2:
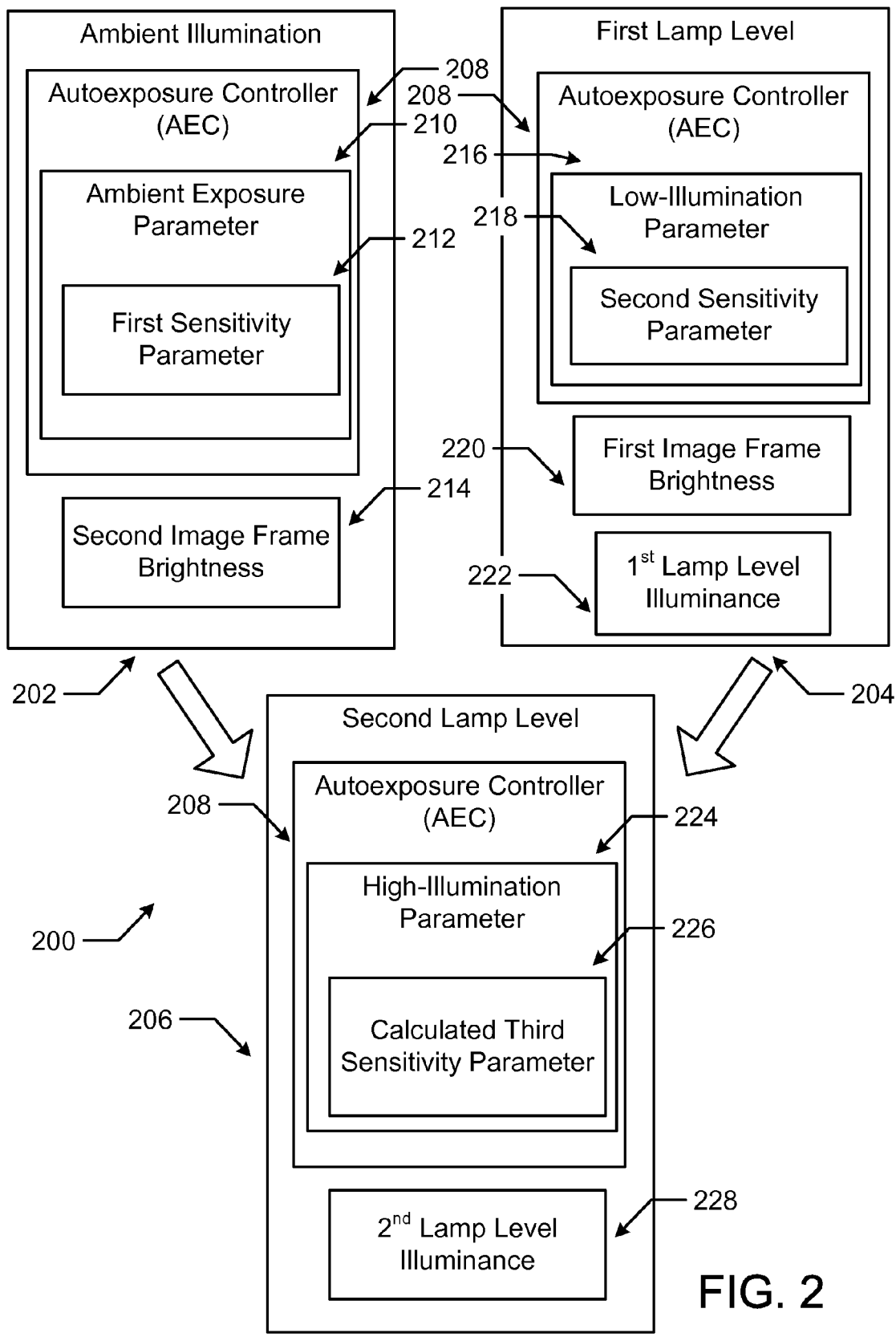
FIG. 2 is a block diagram of a particular illustrative embodiment of an autoexposure controller subjected to three different levels of illumination.

Referring to FIG. 2, a block diagram of a particular illustrative embodiment of an autoexposure controller 208 subjected to three different levels of illumination is illustrated at 200. In a particular embodiment, the autoexposure controller 208 may be implemented in a fashion similar to the autoexposure controller 118 of FIG. 1. At least one ambient exposure parameter 210 may be determined using an ambient illumination 202. The at least one ambient exposure parameter 210 may include a first sensitivity parameter 212 of the autoexposure controller 208 using the ambient illumination 202. At least one low-illumination parameter 216 may be determined using a first lamp level 204. The at least one low-illumination parameter 216 may include a second sensitivity parameter 218 of the autoexposure controller 208 using the first lamp level 204. The autoexposure controller 208 may be configured to operate according to at least one high-illumination parameter 224 based on the at least one ambient exposure parameter 210 and the at least one low-illumination parameter 216.

An image capture operation may be performed using a second lamp level 206 that is brighter than the first lamp level 204. The at least one high-illumination parameter 224 includes a third sensitivity parameter 226 calculated at least partially based on a ratio of a second lamp level illuminance 228 corresponding to the second lamp level 206 to a first lamp level illuminance 222 corresponding to the first lamp level 204. The third sensitivity parameter 226 may be determined further based on a difference of a first image frame brightness 220 at an image sensor, such as the image sensor 110 of FIG. 1, during the first lamp level 204 illumination and a second image frame brightness 214 at the image sensor during the ambient illumination 202. In a particular embodiment, $S_3$, the third sensitivity parameter 226, may be given by the following expression:

$$S_3 = \frac{S_1 L_2}{L_2 + k(L_1 - L_2)}.$$

Here $S_1$ is the first sensitivity parameter 212, $L_1$ is the first image frame brightness 220, $L_2$ is the second image frame brightness 214, and $$k = \frac{Ev_2}{Ev_1},$$

where $Ev_1$ is the first lamp level illuminance 222, and $Ev_2$ is the second lamp level illuminance 228. As indicated in the equation above, the third sensitivity parameter 226 may be determined further based on the first sensitivity parameter 212 (e.g., $S_1$). The third sensitivity parameter 226 may be determined further based on a product of the ratio of the second lamp level illuminance 228 corresponding to the second lamp level 206 to the first lamp level illuminance 222 corresponding to the first lamp level 204 (e.g., $$\frac{Ev_2}{Ev_1} = k)$$

with the difference between the first image frame brightness 220 at the image sensor during the first lamp level 204 illumination and the second image frame brightness 214 at the image sensor during the ambient illumination 202 (e.g., $L_1 - L_2$).

The third sensitivity parameter 226 may be determined further based on a sum of the second image frame brightness 214 at the image sensor during the ambient illumination 202 (e.g., $L_2$) and the product of the ratio of the second lamp level illuminance 228 corresponding to the second lamp level 206 to the first lamp level illuminance 222 corresponding to the first lamp level 204 (e.g., $$\frac{Ev_2}{Ev_1} = k)$$

with the difference between the first image frame brightness 220 at the image sensor during the first lamp level 204 illumination and the second image frame brightness 214 at the image sensor during the ambient illumination 202 (e.g., $L_1 - L_2$), such that, the third sensitivity parameter 226 is determined based on $L_2 + k(L_1 - L_2)$. The third sensitivity parameter 226 may be determined further based on a ratio of the first sensitivity parameter 212 to the sum of the second image frame brightness 214 at the image sensor during the ambient illumination 202 and the product of the ratio of the second lamp level illuminance 228 corresponding to the second lamp level 206 to the first lamp level illuminance 222 corresponding to the first lamp level 204 with the difference between the first image frame brightness 220 at the image sensor during the first lamp level 204 illumination and the second image frame brightness 214 at the image sensor during the ambient illumination 202, e.g., $$\frac{S_1}{L_2 + k(L_1 - L_2)}.$$

Figure 3:
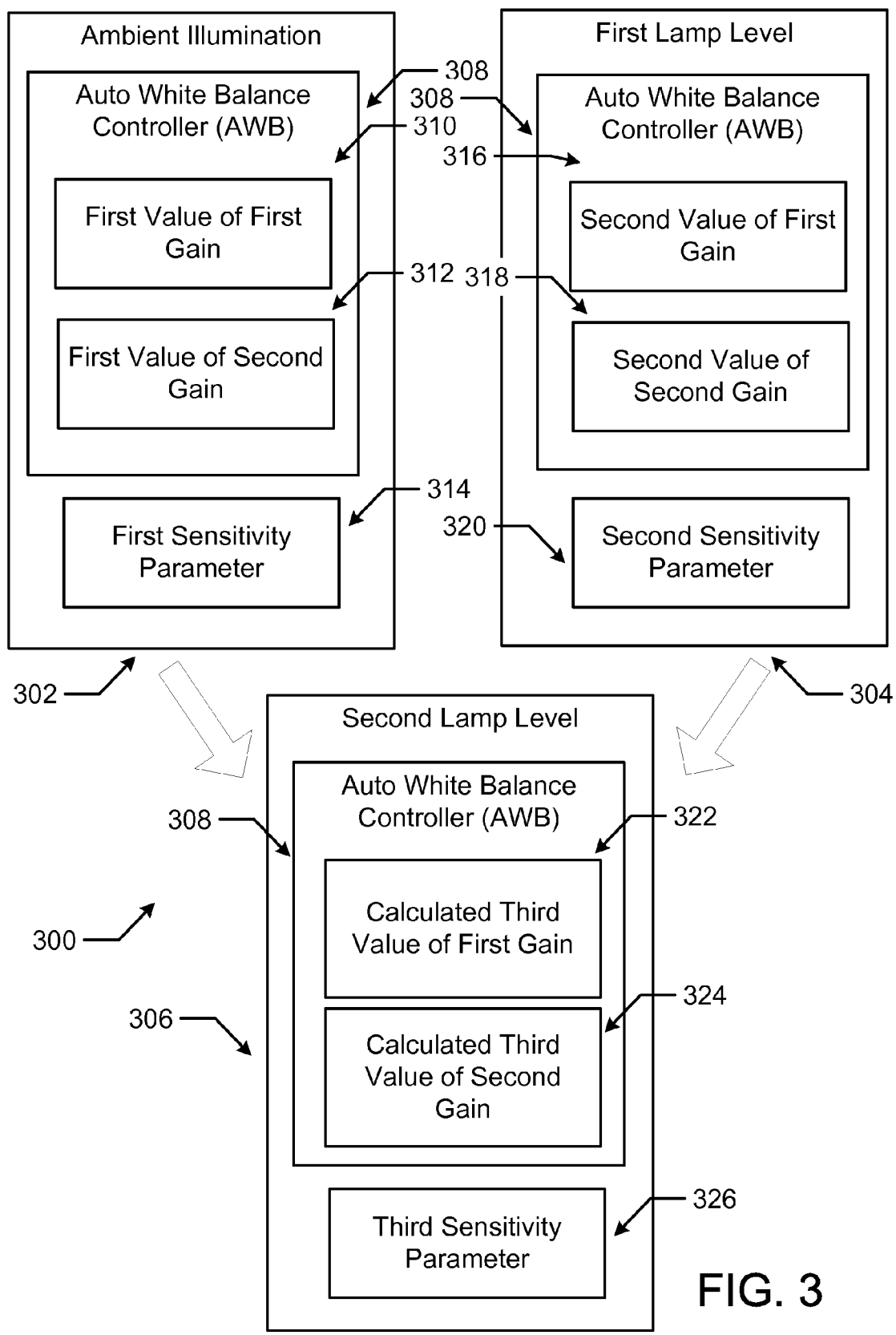
FIG. 3 is a block diagram of a particular illustrative embodiment of an auto white balance controller subjected to three different levels of illumination.

Referring to FIG. 3, a block diagram of a particular illustrative embodiment of an auto white balance controller 308 subjected to three different levels of illumination is illustrated at 300. In a particular embodiment, the auto white balance controller 308 may be implemented in a fashion similar to the auto white balance controller 120 of FIG. 1. A first value of a first gain 310 corresponding to a first color and a first value of a second gain 312 corresponding to a second color may be determined based on an image preview operation using an ambient illumination 302. For example, the first gain may correspond to the gain of red relative to green and the second gain may correspond to the gain of blue relative to green. A second value of the first gain 316 and a second value of the second gain 318 may be determined based on an image preview operation using a first lamp level 304. A first sensitivity parameter 314, a second sensitivity parameter 320, and a third sensitivity parameter 326 may be provided to the auto white balance controller 308. In a particular embodiment, the first sensitivity parameter 314, the second sensitivity parameter 320, and the third sensitivity parameter 326 may be the same as the first sensitivity parameter 212, the second sensitivity parameter 218, and the third sensitivity parameter 226, respectively, of FIG. 2, and may be provided to the auto white balance controller 308 by the autoexposure controller 208.

The auto white balance controller 308 may be configured to use a calculated third value of the first gain 322 and a calculated third value of the second gain 324 to perform a white balance operation on image data captured during an image capture operation. The calculated third value of the first gain 322 may be determined at least partially based on the first value of the first gain 310 and the second value of the first gain 316 and at least partially based on the first sensitivity parameter 314, the second sensitivity parameter 320, and the third sensitivity parameter 326. The calculated third value of the second gain 324 is determined at least partially based on the first value of the second gain 312 and the second value of the second gain 318 and at least partially based on the first sensitivity parameter 314, the second sensitivity parameter 320, and the third sensitivity parameter 326.

In a particular embodiment, the first sensitivity parameter 314, the second sensitivity parameter 320, and the third sensitivity parameter 326 may be provided to the auto white balance controller 308. The auto white balance controller 308 may be configured to use the calculated third value of the first gain 322 as a first gain value corresponding to the first color and the calculated third value of the second gain 324 as a second gain value corresponding to the second color to process image data captured during an image capture operation. The first gain value and the second gain value may be determined at least partially based on the first sensitivity parameter 314, the second sensitivity parameter 320, and the third sensitivity parameter 326.

In a particular embodiment, $[r/g]_3$, the calculated third value of the first gain 322, may be given by the following expression:

$$[r/g]_3 = [r/g]_2 + m([r/g]_2 - [r/g]_1).$$

Here $[r/g]_1$ is the first value of the first gain 310, the gain of red relative to green at the determined white point under ambient illumination 302, $[r/g]_2$ is the second value of the first gain 316, the gain of red relative to green at the determined white point under the first lamp level 304 illumination, and $$m = \frac{(S_2)^2}{S_1 S_3},$$

the ratio of the square of $S_2$, the second sensitivity parameter 320, to the product of $S_1$, the first sensitivity parameter 314, and $S_3$, the third sensitivity parameter 326. Similarly, $[b/g]_3$, the calculated third value of the second gain 324, may be given by the following expression:

$$[b/g]_3 = [b/g]_2 + m([b/g]_2 - [b/g]_1).$$

Here $[b/g]_1$ is the first value of the second gain 312, the gain of blue relative to green at the determined white point under ambient illumination 302, $[b/g]_2$ is the second value of the second gain 318, the gain of blue relative to green at the determined white point under the first lamp level 304 illumination, and $$m = \frac{(S_2)^2}{S_1 S_3},$$

as above.

Thus, the calculated third value of the first gain 322 may be determined at least partially based on a difference between the second value of the first gain 316 and the first value of the first gain 310 (e.g., $[r/g]_2 - [r/g]_1$). The calculated third value of the second gain 324 may be determined at least partially based on a difference between the second value of the second gain 318 and the first value of the second gain 312 (e.g., $[b/g]_2 - [b/g]_1$). In a particular embodiment, the calculated third value of the first gain 322 may be determined at least partially based on a ratio of a square of the second sensitivity parameter 320 to a product of the first sensitivity parameter 314 and the third sensitivity parameter 326 (e.g., $$\frac{(S_2)^2}{S_1 S_2} = m).$$

The calculated third value of the second gain 324 may be determined at least partially based on the ratio of the square of the second sensitivity parameter 320 to the product of the first sensitivity parameter 314 and the third sensitivity parameter 326 (e.g., $$\frac{(S_2)^2}{S_1 S_3} = m).$$

In another particular embodiment, $[r/g]_3$, the calculated third value of the first gain 322, may be given by the following expression:

$$[r/g]_3 = (k_2 - k_1)[r/g]_1 + (k_1 - 1)[r/g]_{LED3}.$$

Here $[r/g]_1$ is the first value of the first gain 310, the gain of red relative to green at the determined white point under ambient illumination 302, $[r/g]_{LED3}$ is the LED red/green color ratio response under the second lamp level 306 illumination, $$k_1 = \frac{S_1}{S_3},$$

the ratio of $S_1$, the first sensitivity parameter 314, to $S_3$, the third sensitivity parameter 326, and $k_2$ is a numerical variable that may be set to a default value or may be adjusted based on user preference. In a particular embodiment, $k_2 = 7.5$ may be used as a starting value. Similarly, $[b/g]_3$, the calculated third value of the second gain 324, may be given by the following expression:

$$[b/g]_3 = (k_2-k_1)[b/g]_1 + (k_1-1)[b/g]_{LED3}.$$

Here $[b/g]_1$ is the first value of the second gain 312, the gain of blue relative to green at the determined white point under ambient illumination 302, $[b/g]_{LED3}$ is the LED blue/green color ratio response under the second lamp level 306 illumination, $$k_1 = \frac{S_1}{S_3},$$

and $k_2$ is a numerical variable that may be set to a default value or may be adjusted based on user preference. In a particular embodiment, $k_2=7.5$ may be used as a starting value. If $k_1<1$, then $k_1$ is set equal to one in the equations above. If $k_1<k_2$, then the red gain $r_{gain}$ may be given by the expression $$r_{gain} = \frac{(k_2-1)}{[r/g]_3}$$

and the blue gain $b_{gain}$ may be given by the expression $$b_{gain} = \frac{(k_2-1)}{[b/g]_3}.$$

If $k_1 \geq k_2$, then the red gain $r_{gain}$ may be given by the expression $$r_{gain} = \frac{1}{[r/g]_3}$$

and the blue gain $b_{gain}$ may be given by the expression $$b_{gain} = \frac{1}{[b/g]_3}.$$

Figure 4:
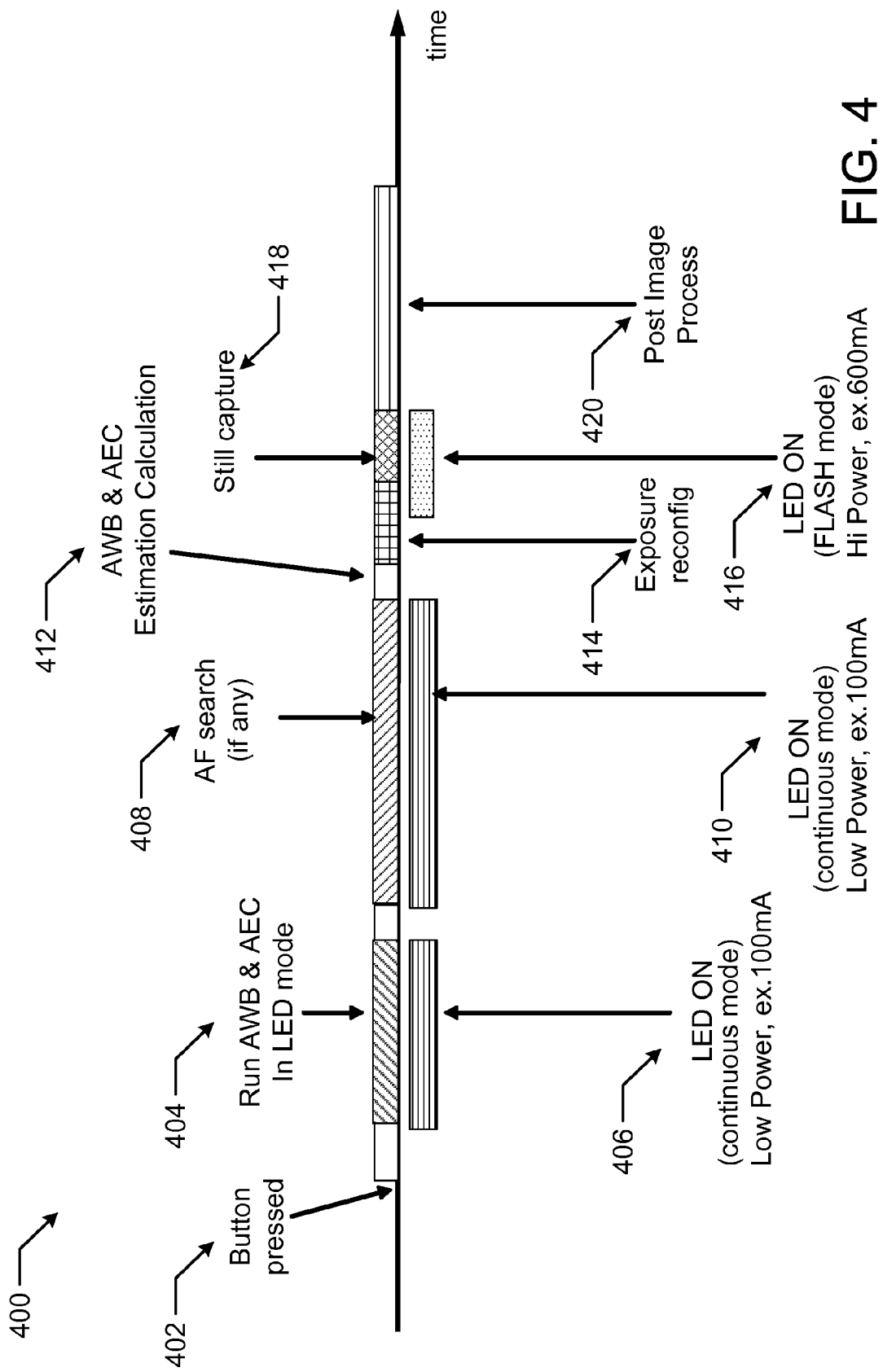
FIG. 4 is a diagram of a timeline of a particular illustrative embodiment of an image capture operation including an estimation of autoexposure control and auto white balance.

Referring to FIG. 4, a diagram of a timeline of a particular illustrative embodiment of an image capture operation including an estimation of autoexposure control and auto white balance is shown at 400. A button of an image capture device, such as the image capture device 102 of FIG. 1, may be pressed, at 402. An autoexposure controller, such as the autoexposure controller 118 of FIG. 1, and an auto white balance controller, such as the auto white balance controller 120 of FIG. 1, may be operated, at 404, during a first lamp level illumination, such as the first lamp level illumination 122 of FIG. 1, at 406. An autofocus search of an image to be captured may be performed, at 408, during the first lamp level illumination, at 410.

At least one high-illumination parameter, such as the high-illumination parameter 224 of FIG. 2, a first gain value, such as the calculated third value of the first gain 322 of FIG. 3, and a second gain value, such as the calculated third value of the second gain 324 of FIG. 3, may be determined, at 412, before performing the image capture operation. In a particular embodiment, the autoexposure controller, such as the autoexposure controller 118 of FIG. 1, may be configured to operate according to at least one high-illumination parameter, such as the high-illumination parameter 224 of FIG. 2, prior to using a second lamp level illumination. An exposure reconfiguration of the autoexposure controller, such as the autoexposure controller 118 of FIG. 1, and the auto white balance controller, such as the auto white balance controller 120 of FIG. 1, may take place, at 414, before performing the image capture operation. A second lamp level illumination, such as the second lamp level illumination 124 of FIG. 1, may be turned on, at 416, and the image capture operation may take place, at 418, using the second lamp level illumination. In a particular embodiment, a high-strength light-emitting diode (LED) may be turned on for two frames to illuminate the final snapshot, where, due to the rolling shutter, the LED turn-on time is two frames instead of one frame. The image data captured during the image capture operation may be processed, at 420, after using the second lamp level illumination.

Figure 5:
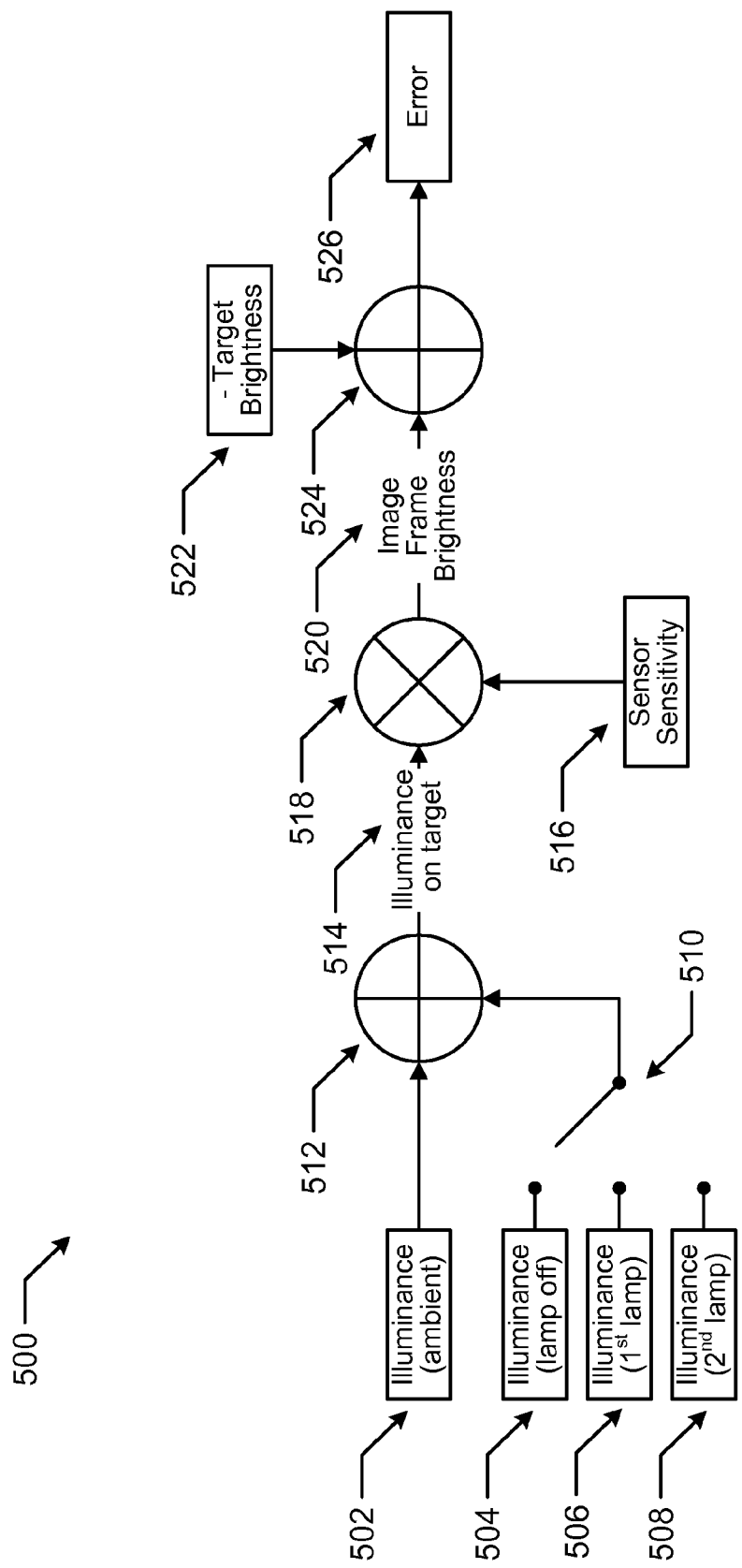
FIG. 5 is a block diagram of a particular illustrative embodiment of estimating autoexposure control in an image capture operation.

Referring to FIG. 5, a block diagram of a particular illustrative embodiment of estimating autoexposure control in an image capture operation is shown at 500. An illuminance at ambient illumination, at 502, may be combined at an adder 512 with an illuminance with the lamp off, at 504, an illuminance at the first lamp level, at 506, or an illuminance at the second lamp level, at 508, as determined by a switch 510. In a particular embodiment, the illuminance with the lamp off, at 504, is the same as no illuminance. The combined illuminance from the adder 512 may be an illuminance on a target, at 514.

The illuminance on the target, at 514, may be combined at a multiplier 518 with an appropriate sensor sensitivity, at 516. The illuminance on the target, at 514, multiplied by the appropriate sensor sensitivity, at 516, may become an image frame brightness, at 520. For example, the ambient illuminance at ambient illumination, at 502, multiplied by the first sensitivity parameter 212 of FIG. 2 becomes the second image frame brightness 214 of FIG. 2. In a particular embodiment, this may be expressed by $Ev_0 \times S_1 = L_2$, where $Ev_0$ is the ambient illuminance at ambient illumination, at 502, $S_1$ is the first sensitivity parameter 212 of FIG. 2, and $L_2$ is the second image frame brightness 214 of FIG. 2. Similarly, $(Ev_0+Ev_1) \times S_1 = L_1$, where $Ev_0$ is the ambient illuminance at ambient illumination, at 502, $Ev_1$ is the illuminance at the first lamp level, at 506, $S_1$ is the first sensitivity parameter 212 of FIG. 2, and $L_1$ is the first image frame brightness 220 of FIG. 2.

A target brightness, at 522, may be subtracted from the image frame brightness, at 520, using an adder 524. A difference between the image frame brightness, at 520, and the target brightness, at 522, represents an error, at 526, the magnitude of which is to be reduced. For example, the error, at 526, may be substantially minimized by a judicious choice of the sensor sensitivity, at 516. In a particular embodiment, $S_3$, the third sensitivity parameter 226 of FIG. 2, may be chosen so that $(Ev_0+Ev_2) \times S_3 = L_2$, where $Ev_0$ is the ambient illuminance at ambient illumination, at 502, $Ev_2$ is the illuminance at the second lamp level, at 508, and $L_2$ is the second image frame brightness 214 of FIG. 2. In a particular embodiment, the third sensitivity parameter 226 of FIG. 2 may be set to make the image sensor output, such as the output from the image sensor 110 of FIG. 1, match the brightness when the lamp is off.

Figure 6:
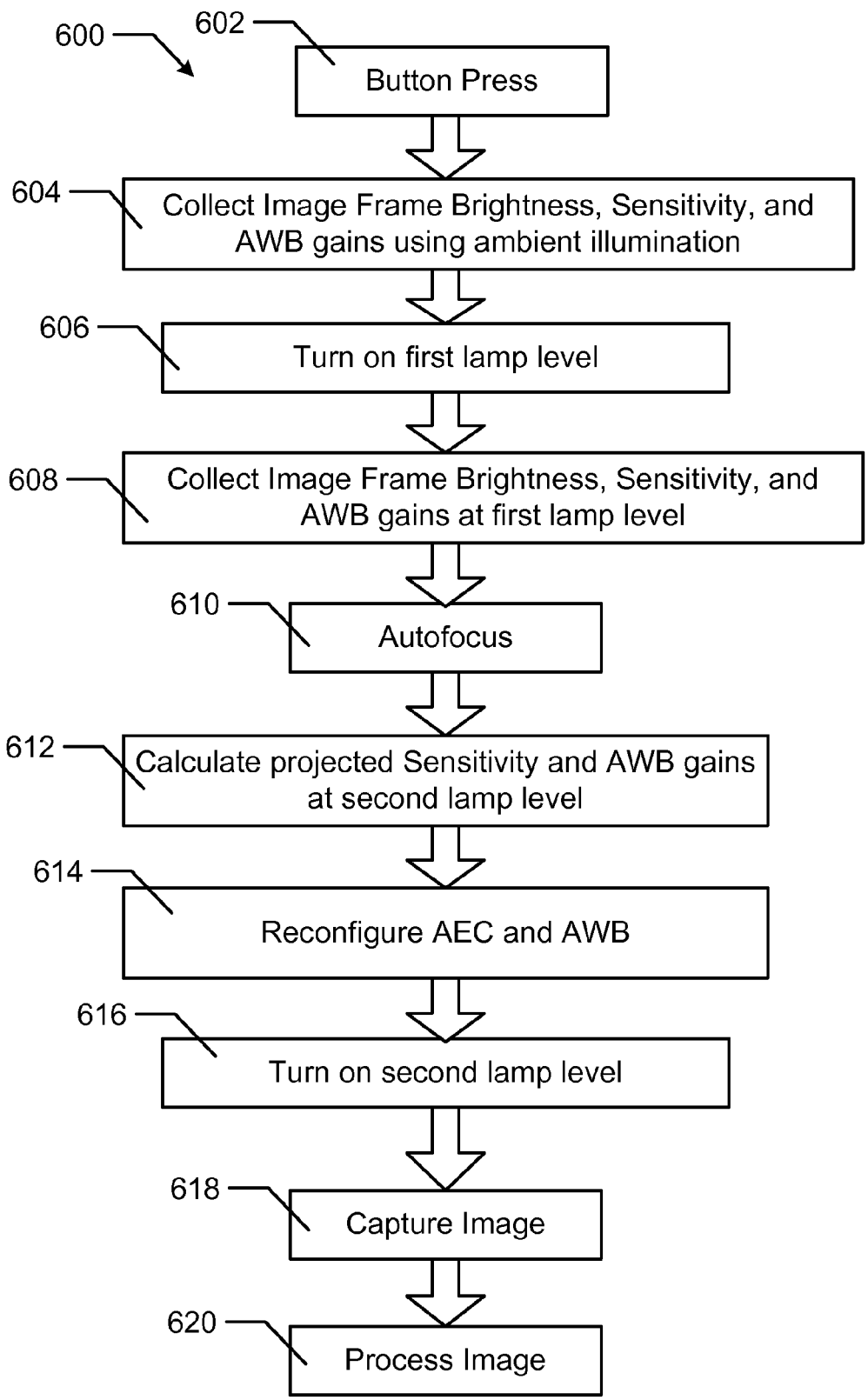
FIG. 6 is a flow diagram of a first illustrative embodiment of a method to estimate autoexposure control and auto white balance in an image capture operation.

Referring to FIG. 6, a flow diagram of a first illustrative embodiment of a method to estimate autoexposure control and auto white balance in an image capture operation is shown at 600. The method 600 includes pressing a button, at 602, of an image capture device, such as the image capture device 102 of FIG. 1. The method 600 also includes collecting the second image frame brightness, the first sensitivity parameter, the first value of the first gain, and the first value of the second gain during the image preview operation using the ambient illumination, at 604. For example, the second image frame brightness 214 of FIG. 2, the first sensitivity parameter 212 of FIG. 2, the first value of the first gain 310 of FIG. 3, and the first value of the second gain 312 of FIG. 3 may be collected during the image preview operation using the ambient illumination 202, 302.

The method 600 further includes turning on a first lamp level, at 606. The method 600 also includes collecting the first image frame brightness, the second sensitivity parameter, the second value of the first gain, and the second value of the second gain during the image preview operation using the first lamp level, at 608. For example, the first image frame brightness 220 of FIG. 2, the second sensitivity parameter 218 of FIG. 2, the second value of the first gain 316 of FIG. 3, and the second value of the second gain 318 of FIG. 3 may be collected during the image preview operation using the first lamp level 204, 304. The method 600 further includes performing an autofocus operation on an image to be captured, at 610.

The method 600 also includes determining the third sensitivity parameter, the third value of the first gain, and the third value of the second gain before performing the image capture operation, at 612. For example, the third sensitivity parameter 226 of FIG. 2, the calculated third value of the first gain 322 of FIG. 3, and the calculated third value of the second gain 324 of FIG. 3 may be determined before performing the image capture operation. The method 600 further includes reconfiguring the autoexposure controller and the auto white balance controller, at 614. For example, the autoexposure controller (AEC) 118 of FIG. 1 and the auto white balance controller (AWB) 120 of FIG. 1 may be reconfigured. The method 600 also includes turning on a second lamp level, at 616, capturing the image, at 618, and processing the captured image, at 620.

Figure 7:
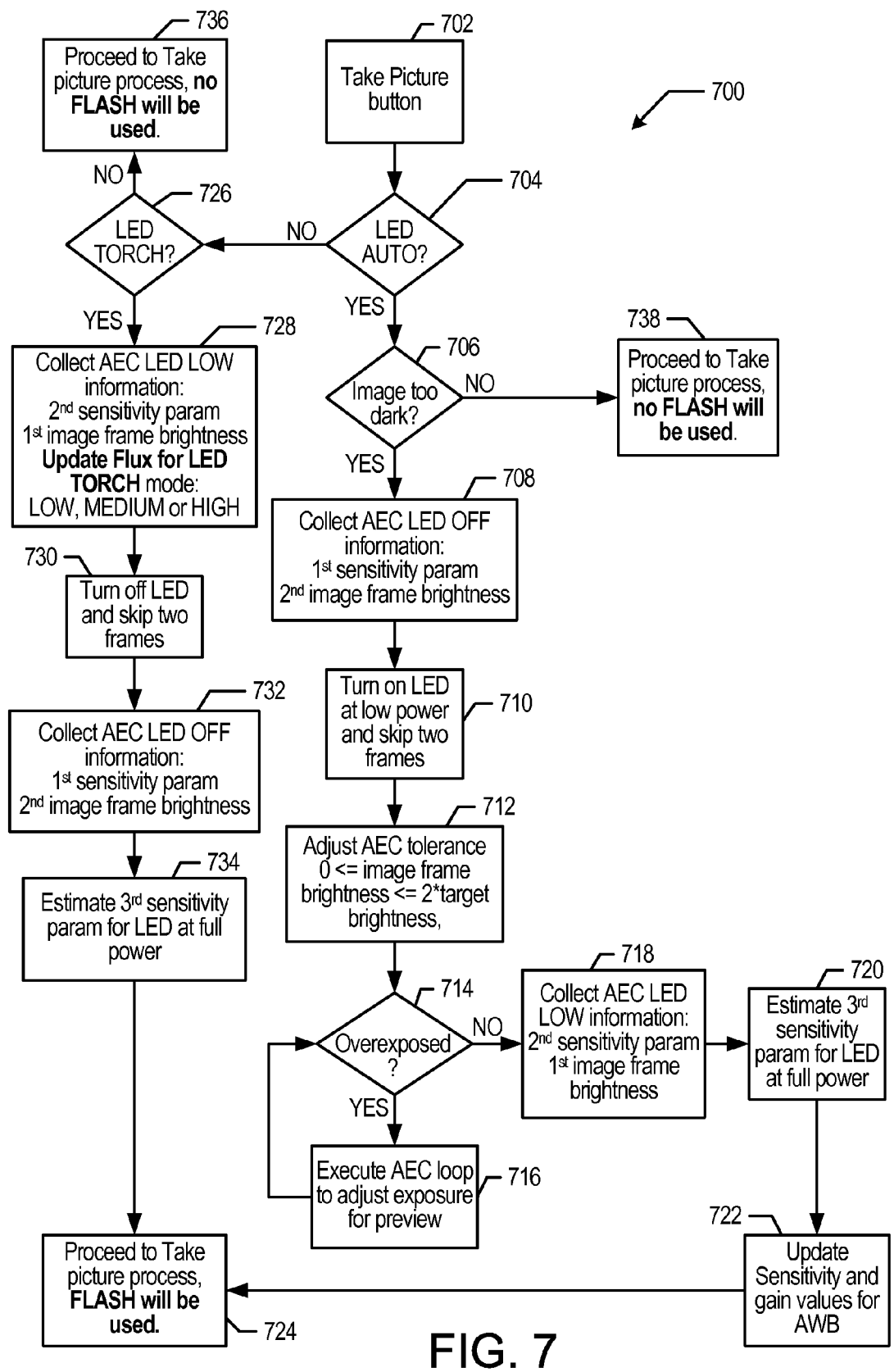
FIG. 7 is a flow diagram of a second illustrative embodiment of a method to estimate autoexposure control and auto white balance in an image capture operation.

Referring to FIG. 7, a flow diagram of a second illustrative embodiment of a method to estimate autoexposure control and auto white balance in an image capture operation is shown at 700. The method 700 includes pressing a take picture button, at 702, of an image capture device, such as the image capture device 102 of FIG. 1. The method 700 also includes determining, at 704, whether an light-emitting diode (LED) flash device is in an automatic mode. If the LED flash device is in the automatic mode, then the method 700 includes determining, at 706, whether an image is too dark. In a particular embodiment, an exposure index for the image may be compared with a maximum exposure index, and if the exposure index for the image is greater than or equal to the maximum exposure index, then the image is too dark. If the image is not too dark, the method 700 includes proceeding to the take the picture process and no flash will be used, at 738.

If the image is too dark, the method 700 includes collecting autoexposure controller (AEC) information while the LED is off, using an ambient illumination, at 708. The AEC information collected while the LED is off may include a first sensitivity parameter, such as the first sensitivity parameter 212 of FIG. 2, and a second image frame brightness, such as the second image frame brightness 214 of FIG. 2. In a particular embodiment, the AEC information may include an LED off exposure index and an LED off luma. The method 700 also includes turning on the LED at low power and skipping two frames, at 710. The method 700 further includes adjusting an AEC tolerance so that the image frame brightness is greater than or equal to zero, and is less than or equal to twice the target brightness, at 712. In a particular embodiment, the AEC tolerance is adjusted so that the luma is greater than or equal to zero, and is less than or equal to twice the target luma. The method further includes determining, at 714, whether the image is overexposed. If the image is overexposed, the method 700 includes executing an AEC loop to adjust the exposure for preview, at 716. In a particular embodiment, the luma settled count may be updated as appropriate.

If the image is not overexposed, the method 700 includes collecting AEC information while the LED is on at low power, at 718. The AEC information collected while the LED is on at low power may include a second sensitivity parameter, such as the second sensitivity parameter 218 of FIG. 2, and a first image frame brightness, such as the first image frame brightness 220 of FIG. 2. In a particular embodiment, the AEC information may include an LED low exposure index and an LED low luma. The method 700 further includes estimating a third sensitivity parameter, such as the third sensitivity parameter 226 of FIG. 2, for the LED at full power, at 720. In a particular embodiment, the exposure index for the LED at full power may be estimated and the exposure index for the image may be updated accordingly. The method 700 also includes updating sensitivity values for an auto white balance controller (AWB), at 722. In a particular embodiment, gain values for the AWB may also be updated. The method 700 further includes proceeding to the take the picture process and the flash will be used, at 724.

If the LED flash device is not in the automatic mode, then the method 700 includes determining, at 726, whether the LED is in a torch mode, on at low power. If the LED is not in the torch mode, the method 700 includes proceeding to the take the picture process and no flash will be used, at 736. If the LED is in the torch mode, the method 700 includes collecting AEC information while the LED is on at low power, at 728. The AEC information collected while the LED is on at low power may include a second sensitivity parameter, such as the second sensitivity parameter 218 of FIG. 2, and a first image frame brightness, such as the first image frame brightness 220 of FIG. 2. In a particular embodiment, the AEC information may include an LED low exposure index and an LED low luma. The flux for the LED torch mode may also be updated, for low, medium, and high.

The method 700 further includes turning off the LED and skipping two frames, at 730. The method 700 also includes collecting AEC information while the LED is off, using an ambient illumination, at 732. The AEC information collected while the LED is off may include a first sensitivity parameter, such as the first sensitivity parameter 212 of FIG. 2, and a second image frame brightness, such as the second image frame brightness 214 of FIG. 2. In a particular embodiment, the AEC information may include an LED off exposure index and an LED off luma.

The method 700 further includes estimating a third sensitivity parameter, such as the third sensitivity parameter 226 of FIG. 2, for the LED at full power, at 734. In a particular embodiment, the exposure index for the LED at full power may be estimated and the exposure index for the image may be updated accordingly. The method 700 also includes proceeding to the take the picture process and the flash will be used, at 724.

Figure 8:
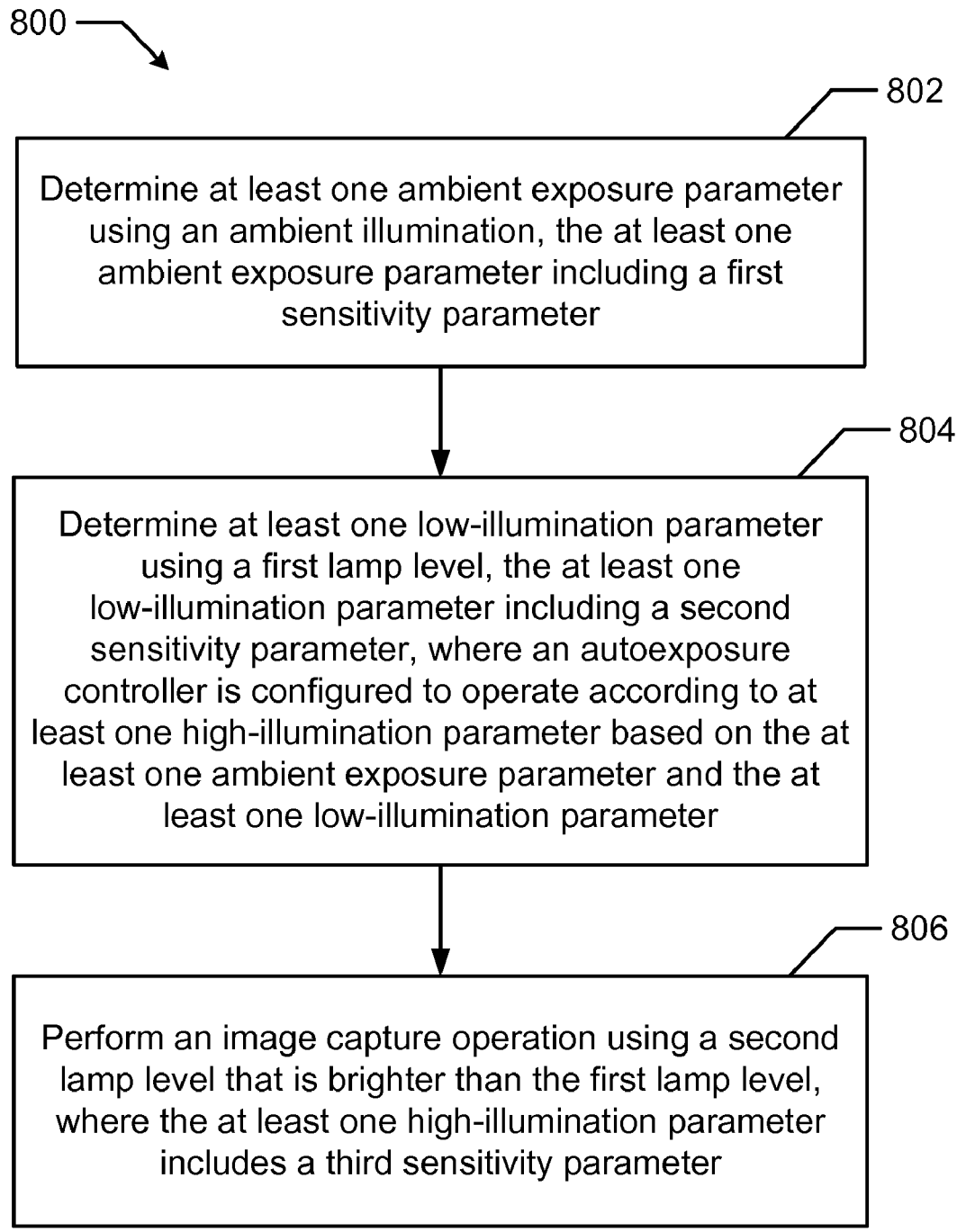
FIG. 8 is a flow diagram of a third illustrative embodiment of a method to estimate autoexposure control and auto white balance in an image capture operation.

Referring to FIG. 8, a flow diagram of a third illustrative embodiment of a method to estimate autoexposure control and auto white balance in an image capture operation is shown at 800. The method 800 includes determining at least one ambient exposure parameter using an ambient illumination, the at least one ambient exposure parameter including a first sensitivity parameter of an autoexposure controller using the ambient illumination, at 802. For example, as shown in FIG. 2, at least one ambient exposure parameter 210 may be determined using the ambient illumination 202, where the at least one ambient exposure parameter 210 may include the first sensitivity parameter 212 of the autoexposure controller 208 using the ambient illumination 202.

The method 800 also includes determining at least one low-illumination parameter using a first lamp level, the at least one low-illumination parameter including a second sensitivity parameter of the autoexposure controller using the first lamp level, where the autoexposure controller is configured to operate according to at least one high-illumination parameter based on the at least one ambient exposure parameter and the at least one low-illumination parameter, at 804. For example, as shown in FIG. 2, at least one low-illumination parameter 216 may be determined using the first lamp level 204, where the at least one low-illumination parameter 216 may include the second sensitivity parameter 218 of the autoexposure controller 208 using the first lamp level 204. As shown in FIG. 2, the autoexposure controller 208 may be configured to operate according to at least one high-illumination parameter 224 based on the at least one ambient exposure parameter 210 and the at least one low-illumination parameter 216.

The method 800 further includes performing an image capture operation using a second lamp level that is brighter than the first lamp level, where the at least one high-illumination parameter includes a third sensitivity parameter, at 806. The third sensitivity parameter is calculated at least partially based on a ratio of an illuminance corresponding to the second lamp level to an illuminance corresponding to the first lamp level. The third sensitivity parameter is determined further based on a difference of a first image frame brightness at an image sensor during the first lamp level illumination and a second image frame brightness at the image sensor during the ambient illumination.

For example, as shown in FIG. 2, the image capture operation may be performed using the second lamp level 206 that is brighter than the first lamp level 204. The at least one high-illumination parameter 224 includes the third sensitivity parameter 226 calculated at least partially based on the ratio of the second lamp level illuminance 228 corresponding to the second lamp level 206 to the first lamp level illuminance 222 corresponding to the first lamp level 204. The third sensitivity parameter 226 may be determined further based on the difference of the first image frame brightness 220 at the image sensor, such as the image sensor 110 of FIG. 1, during the first lamp level 204 illumination and the second image frame brightness 214 at the image sensor during the ambient illumination 202.

Figure 9:
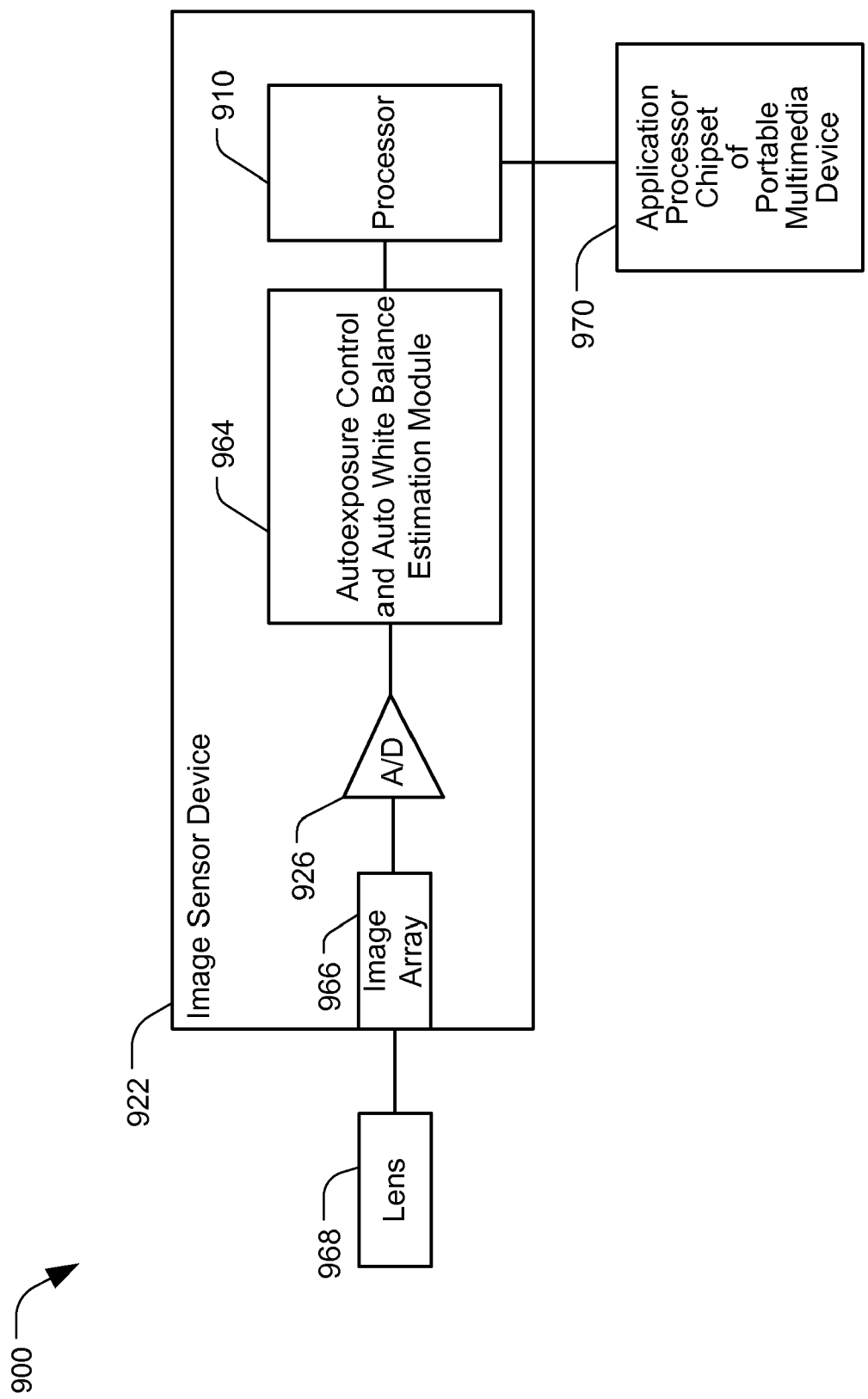
FIG. 9 is a block diagram of a particular embodiment of a device including an autoexposure control and auto white balance estimation module.

FIG. 9 is a block diagram of particular embodiment of a system including an autoexposure control and auto white balance estimation module. The system 900 includes an image sensor device 922 that is coupled to a lens 968 and also coupled to an application processor chipset of a portable multimedia device 970. The image sensor device 922 includes an autoexposure control and auto white balance estimation module 964 to estimate autoexposure control and auto white balance parameters, such as by implementing one or more of the systems of FIGS. 1-3, by operating in accordance with any of the embodiments of FIGS. 4-8, or any combination thereof.

The autoexposure control and auto white balance estimation module 964 is coupled to receive image data from an image array 966, such as via an analog-to-digital convertor 926 that is coupled to receive an output of the image array 966 and to provide the image data to the autoexposure control and auto white balance estimation module 964.

The image sensor device 922 may also include a processor 910. In a particular embodiment, the processor 910 is configured to implement the autoexposure control and auto white balance estimation module 964. In another embodiment, the autoexposure control and auto white balance estimation module 964 is implemented as image processing circuitry.

The processor 910 may also be configured to perform additional image processing operations, such as one or more of the operations performed by the processor 116 of FIG. 1. The processor 910 may provide processed image data to the application processor chipset of the portable multimedia device 970 for further processing, transmission, storage, display, or any combination thereof.

Figure 10:
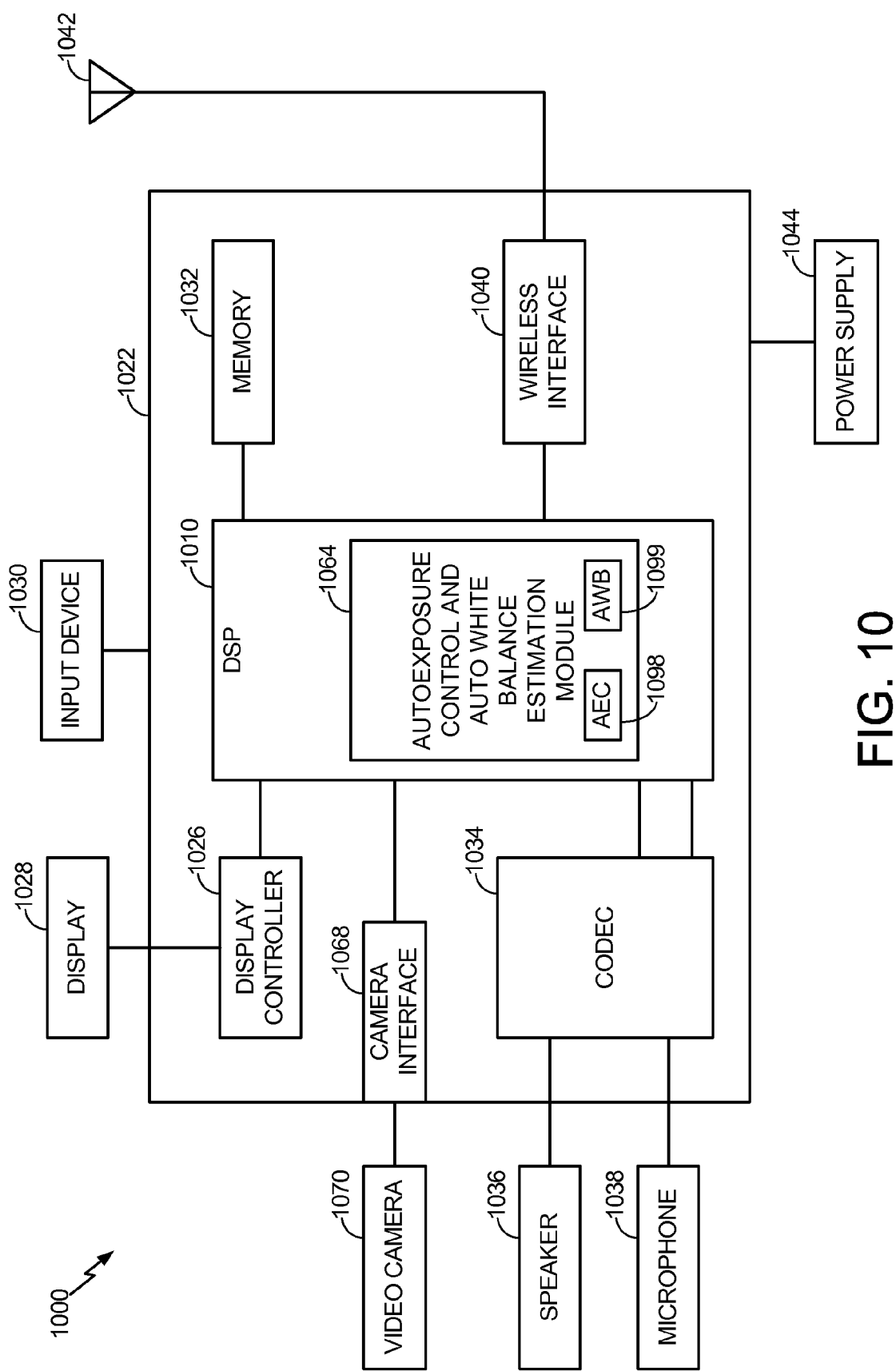
FIG. 10 is a block diagram of a particular embodiment of a portable communication device including an autoexposure control and auto white balance estimation module.

FIG. 10 is a block diagram of particular embodiment of a system including an autoexposure control and auto white balance estimation module. The system 1000 may be implemented in a portable electronic device and includes a signal processor 1010, such as a digital signal processor (DSP), coupled to a memory 1032. The system 1000 includes an autoexposure control and auto white balance estimation module 1064. In an illustrative example, the autoexposure control and auto white balance estimation module 1064 includes any of the systems of FIGS. 1-3, operates in accordance with any of the embodiments of FIGS. 4-8, or any combination thereof. The autoexposure control and auto white balance estimation module 1064 may be in the signal processor 1010 or may be a separate device or circuitry along a hardware image processing pipeline (not shown). The autoexposure control and auto white balance estimation module 1064 includes means for controlling an autoexposure 1098 and means for controlling an auto white balance 1099. The means for controlling an autoexposure 1098 and means for controlling an auto white balance 1099 may include hardware circuitry, firmware, a processor or a controller executing code, a field programmable array, or any combination thereof.

A camera interface 1068 is coupled to the signal processor 1010 and also coupled to a camera, such as a video camera 1070. A display controller 1026 is coupled to the signal processor 1010 and to a display device 1028. A coder/decoder (CODEC) 1034 can also be coupled to the signal processor 1010. A speaker 1036 and a microphone 1038 can be coupled to the CODEC 1034. A wireless interface 1040 can be coupled to the signal processor 1010 and to a wireless antenna 1042.

The signal processor 1010 may also be adapted to generate processed image data. The display controller 1026 is configured to receive the processed image data and to provide the processed image data to the display device 1028. In addition, the memory 1032 may be configured to receive and to store the processed image data, and the wireless interface 1040 may be configured to receive the processed image data for transmission via the antenna 1042.

In a particular embodiment, the signal processor 1010, the display controller 1026, the memory 1032, the CODEC 1034, the wireless interface 1040, and the camera interface 1068 are included in a system-in-package or system-on-chip device 1022. In a particular embodiment, an input device 1030 and a power supply 1044 are coupled to the system-on-chip device 1022. Moreover, in a particular embodiment, as illustrated in FIG. 10, the display device 1028, the input device 1030, the speaker 1036, the microphone 1038, the wireless antenna 1042, the video camera 1070, and the power supply 1044 are external to the system-on-chip device 1022. However, each of the display device 1028, the input device 1030, the speaker 1036, the microphone 1038, the wireless antenna 1042, the video camera 1070, and the power supply 1044 can be coupled to a component of the system-on-chip device 1022, such as an interface or a controller.

Those of skill would further appreciate that the various illustrative logical blocks, configurations, modules, circuits, and algorithm steps described in connection with the embodiments disclosed herein may be implemented as electronic hardware, computer software, or combinations of both. To clearly illustrate this interchangeability of hardware and software, various illustrative components, blocks, configurations, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The steps of a method or algorithm described in connection with the embodiments disclosed herein may be embodied directly in hardware, in a software module executed by a processor, or in a combination of the two. A software module may reside in random access memory (RAM), flash memory, read-only memory (ROM), programmable read-only memory (PROM), erasable programmable read-only memory (EPROM), electrically erasable programmable read-only memory (EEPROM), registers, hard disk, a removable disk, a compact disk read-only memory (CD-ROM), or any other form of storage medium known in the art. An exemplary storage medium is coupled to the processor such that the processor can read information from, and write information to, the storage medium. In the alternative, the storage medium may be integral to the processor. The processor and the storage medium may reside in an application-specific integrated circuit (ASIC). The ASIC may reside in a computing device or a user terminal. In the alternative, the processor and the storage medium may reside as discrete components in a computing device or user terminal.

The previous description of the disclosed embodiments is provided to enable any person skilled in the art to make or use the disclosed embodiments. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope possible consistent with the principles and novel features as defined by the following claims.

The invention claimed is:

1. A method comprising:
   determining at least one ambient exposure parameter using an ambient illumination, the at least one ambient exposure parameter including a first sensitivity parameter of an autoexposure controller using the ambient illumination;
   determining at least one low-illumination parameter using a first lamp level, the at least one low-illumination parameter including a second sensitivity parameter of the autoexposure controller using the first lamp level, wherein the autoexposure controller is configured to operate according to at least one high-illumination parameter based on the at least one ambient exposure parameter and the at least one low-illumination parameter; and
   performing an image capture operation using a second lamp level that is brighter than the first lamp level,
   wherein the at least one high-illumination parameter includes a third sensitivity parameter calculated at least partially based on a ratio of an illuminance corresponding to the second lamp level to an illuminance corresponding to the first lamp level, the third sensitivity parameter determined further based on a difference of a first image frame brightness at an image sensor during the first lamp level illumination and a second image frame brightness at the image sensor during the ambient illumination.

2. The method of claim 1, further comprising:
   providing the first, the second, and the third sensitivity parameters to an auto white balance controller; and
   configuring the auto white balance controller to use a first gain value corresponding to a first color and a second gain value corresponding to a second color to process image data captured during the image capture operation, the first gain value and the second gain value determined at least partially based on the first, the second, and the third sensitivity parameters.

3. The method of claim 2, further comprising:
   operating the autoexposure controller and the auto white balance controller during the first lamp level illumination;
   performing an auto focus search of an image to be captured during the first lamp level illumination;
   determining the at least one high-illumination parameter, the first gain value, and the second gain value before performing the image capture operation; and
   processing the image data captured during the image capture operation after using the second lamp level.

4. The method of claim 1, wherein the autoexposure controller is configured to operate according to the at least one high-illumination parameter prior to using the second lamp level.

5. The method of claim 1, wherein the first lamp level is generated by a low-power mode of a flash device coupled to a camera and wherein the second lamp level is generated by a high-power mode of the flash device coupled to the camera.

6. The method of claim 5, wherein the flash device is a light-emitting diode (LED) type flash device.

7. The method of claim 5, wherein the flash device is a xenon-type flash device.

8. The method of claim 1, further comprising:
   determining a first value of a first gain corresponding to a first color and a first value of a second gain corresponding to a second color based on an image preview operation using the ambient illumination; and
   determining a second value of the first gain and a second value of the second gain based on an image preview operation using the first lamp level.

9. The method of claim 8, further comprising:
   providing the first, the second, and the third sensitivity parameters to an auto white balance controller; and
   configuring the auto white balance controller to use a third value of the first gain and a third value of the second gain to perform a white balance operation on image data captured during the image capture operation,
   wherein the third value of the first gain is determined at least partially based on the first value of the first gain and the second value of the first gain and at least partially based on the first, the second, and the third sensitivity parameters, and wherein
   the third value of the second gain is determined at least partially based on the first value of the second gain and the second value of the second gain and at least partially based on the first, the second, and the third sensitivity parameters.

10. The method of claim 9, further comprising:
collecting the second image frame brightness, the first sensitivity parameter, the first value of the first gain, and the first value of the second gain during the image preview operation using the ambient illumination;
collecting the first image frame brightness, the second sensitivity parameter, the second value of the first gain, and the second value of the second gain during the image preview operation using the first lamp level;
performing an auto focus operation on an image to be captured;
determining the third sensitivity parameter, the third value of the first gain, and the third value of the second gain before performing the image capture operation;
reconfiguring the autoexposure controller and the auto white balance controller before performing the image capture operation; and
processing the image data captured during the image capture operation.

11. The method of claim 10, wherein the third value of the first gain is determined at least partially based on a difference between the second value of the first gain and the first value of the first gain, and wherein the third value of the second gain is determined at least partially based on a difference between the second value of the second gain and the first value of the second gain.

12. The method of claim 11, wherein the third value of the first gain is determined at least partially based on a ratio of a square of the second sensitivity parameter to a product of the first and the third sensitivity parameters, and wherein the third value of the second gain is determined at least partially based on the ratio of the square of the second sensitivity parameter to the product of the first and the third sensitivity parameters.

13. The method of claim 1, wherein the third sensitivity parameter is determined further based on the first sensitivity parameter.

14. The method of claim 1, wherein the third sensitivity parameter is determined further based on a product of the ratio of the illuminance corresponding to the second lamp level to the illuminance corresponding to the first lamp level with the difference between the first image frame brightness at the image sensor during the first lamp level illumination and the second image frame brightness at the image sensor during the ambient illumination.

15. The method of claim 14, wherein the third sensitivity parameter is determined further based on a sum of the image frame brightness at the image sensor during the ambient illumination and the product of the ratio of the illuminance corresponding to the second lamp level to the illuminance corresponding to the first lamp level with the difference between the first image frame brightness at the image sensor during the first lamp level illumination and the second image frame brightness at the image sensor during the ambient illumination.

16. The method of claim 15, wherein the third sensitivity parameter is determined further based on a ratio of the first sensitivity parameter to the sum of the image frame brightness at the image sensor during the ambient illumination and the product of the ratio of the illuminance corresponding to the second lamp level to the illuminance corresponding to the first lamp level with the difference between the first image frame brightness at the image sensor during the first lamp level illumination and the second image frame brightness at the image sensor during the ambient illumination.

17. A method comprising:
determining at least one ambient exposure parameter using an ambient illumination, the at least one ambient exposure parameter including a first sensitivity parameter of an autoexposure controller using the ambient illumination;
determining at least one low-illumination parameter using a low-power illumination mode of a flash device, the at least one low-illumination parameter including a second sensitivity parameter of the autoexposure controller using the low-power illumination mode; and
performing an image capture operation using a high-power illumination mode of the flash device,
wherein the autoexposure controller is configured to operate according to at least one high-illumination parameter based on the at least one ambient exposure parameter and the at least one low-illumination parameter, and wherein the at least one high-illumination parameter includes a third sensitivity parameter calculated at least partially based on a ratio of an illuminance corresponding to the high-power illumination mode to an illuminance corresponding to the low-power illumination mode, the third sensitivity parameter determined further based on a difference of an image frame brightness at an image sensor during the low-power illumination mode and an image frame brightness at the image sensor during the ambient illumination.

18. The method of claim 17, further comprising:
determining a first value of a first gain corresponding to a first color and a first value of a second gain corresponding to a second color based on an image preview operation using the ambient illumination; and
determining a second value of the first gain and a second value of the second gain based on an image preview operation using the low-power illumination mode.

19. The method of claim 18, further comprising:
providing the first, the second, and the third sensitivity parameters to an auto white balance controller; and
configuring the auto white balance controller to use a third value of the first gain and a third value of the second gain to perform a white balance operation on image data captured during the image capture operation,
wherein the third value of the first gain is determined at least partially based on the first value of the first gain and the second value of the first gain and at least partially based on the first, the second, and the third sensitivity parameters, and
wherein the third value of the second gain is determined at least partially based on the first value of the second gain and the second value of the second gain and at least partially based on the first, the second, and the third sensitivity parameters.

20. An apparatus comprising:
an auto exposure controller configured to operate according to at least one high-illumination parameter based on at least one ambient exposure parameter and at least one low-illumination parameter,
wherein the at least one ambient exposure parameter is determined using an ambient illumination, the at least one ambient exposure parameter including a first sensitivity parameter of the autoexposure controller using the ambient illumination,
wherein the at least one low-illumination parameter is determined using a low-power illumination mode of a flash device, the at least one low-illumination parameter including a second sensitivity parameter of the auto exposure controller using the low-power illumination mode, and wherein a high-power illumination mode of the flash device is used to perform an image capture operation, wherein the at least one high-illumination parameter includes a third sensitivity parameter calculated at least partially based on a ratio of an illuminance corresponding to the high-power illumination mode to an illuminance corresponding to the low-power illumination mode, the third sensitivity parameter determined further based on a difference of an image frame brightness at an image sensor during the low-power illumination mode and an image frame brightness at the image sensor during the ambient illumination.

21. The apparatus of claim 20, further comprising an auto white balance controller, wherein the first, the second, and the third sensitivity parameters are provided to the auto white balance controller by the autoexposure controller.

22. The apparatus of claim 21, wherein:
a first value of a first gain corresponding to a first color and a first value of a second gain corresponding to a second color are determined based on a first image preview operation using the ambient illumination;
a second value of the first gain and a second value of the second gain are determined based on a second image preview operation using the low-power illumination mode; and
wherein the auto white balance controller is configured to use a third value of the first gain and a third value of the second gain to perform a white balance operation on image data captured during the image capture operation,
wherein the third value of the first gain is determined at least partially based on the first value of the first gain and the second value of the first gain and at least partially based on the first, the second, and the third sensitivity parameters, and
wherein the third value of the second gain is determined at least partially based on the first value of the second gain and the second value of the second gain and at least partially based on the first, the second, and the third sensitivity parameters.

23. The apparatus of claim 20, further comprising:
the image sensor; and the flash device.

24. An apparatus comprising:
means for controlling an autoexposure to operate according to at least one high-illumination parameter based on at least one ambient exposure parameter and at least one low-illumination parameter; and
means for controlling an auto white balance,
wherein the at least one ambient exposure parameter is determined using an ambient illumination, the at least one ambient exposure parameter including a first sensitivity parameter of the means for controlling the autoexposure using the ambient illumination,
wherein the at least one low-illumination parameter is determined using a low-power illumination mode of a flash device, the at least one low-illumination parameter including a second sensitivity parameter of the means for controlling the autoexposure using the low-power illumination mode,
wherein a high-power illumination mode of the flash device is used to perform an image capture operation, wherein the at least one high-illumination parameter includes a third sensitivity parameter calculated at least partially based on a ratio of an illuminance corresponding to the high-power illumination mode to an illuminance corresponding to the low-power illumination mode, the third sensitivity parameter determined further based on a difference of an image frame brightness at an image sensor during the low-power illumination mode and an image frame brightness at the image sensor during the ambient illumination, and
wherein the first, the second, and the third sensitivity parameters are provided to the means for controlling the auto white balance by the means for controlling the autoexposure.

25. The apparatus of claim 24, wherein:
a first value of a first gain corresponding to a first color and a first value of a second gain corresponding to a second color are determined based on a first image preview operation using the ambient illumination;
a second value of the first gain and a second value of the second gain are determined based on a second image preview operation using the low-power illumination mode; and
wherein the means for controlling the auto white balance controller uses a third value of the first gain and a third value of the second gain to perform a white balance operation on image data captured during the image capture operation,
wherein the third value of the first gain is determined at least partially based on the first value of the first gain and the second value of the first gain and at least partially based on the first, the second, and the third sensitivity parameters, and
wherein the third value of the second gain is determined at least partially based on the first value of the second gain and the second value of the second gain and at least partially based on the first, the second, and the third sensitivity parameters.

26. A computer-readable medium containing computer executable instructions that are operative to cause a computer to:
determine at least one ambient exposure parameter, the at least one ambient exposure parameter including a first sensitivity parameter of an autoexposure controller using an ambient illumination;
determine at least one low-illumination parameter, the at least one low-illumination parameter including a second sensitivity parameter of the auto exposure controller using a first lamp level;
configure the autoexposure controller to operate according to at least one high-illumination parameter based on the at least one ambient exposure parameter and the at least one low-illumination parameter; and
perform an image capture operation using a second lamp level that is brighter than the first lamp level, wherein the at least one high-illumination parameter includes a third sensitivity parameter calculated at least partially based on a ratio of an illuminance corresponding to the second lamp level to an illuminance corresponding to the first lamp level, the third sensitivity parameter determined further based on a difference of an image frame brightness at an image sensor during the first lamp level illumination and an image frame brightness at the image sensor during the ambient illumination.

27. The computer-readable medium of claim 26, wherein the computer executable instructions are further operative to cause the computer to:
provide the first, the second, and the third sensitivity parameters to an auto white balance controller.

28. The computer-readable medium of claim 27, wherein the computer executable instructions are further operative to cause the computer to:

configure the auto white balance controller to use a first gain value corresponding to a first color and a second gain value corresponding to a second color to process image data captured during the image capture operation, the first gain value and the second gain value determined at least partially based on the first, the second, and the third sensitivity parameters.

29. A method comprising:

determining a first sensor sensitivity using ambient illumination;

determining a second sensor sensitivity using a first lamp level;

capturing an image using a second lamp level based on the first sensor sensitivity and the second sensor sensitivity, wherein the second lamp level is brighter than the first lamp level.

30. The method of claim 29, wherein the capturing of the image is also based on a ratio of an illuminance corresponding to the second lamp level to an illuminance corresponding to the first lamp level.

31. The method of claim 30, wherein the capturing of the image is also based on a difference between the illuminance on the target at ambient light level multiplied by the first sensor sensitivity and the illuminance on the target at the first lamp level multiplied by the second sensor sensitivity.

* * * * *